United States Patent [19]

Yarris

[11] 4,019,786
[45] Apr. 26, 1977

[54] SHIELDED SIDE THRUST ROLLER ASSEMBLY FOR LIFT TRUCK MAST UNITS

[75] Inventor: William T. Yarris, Brookpark, Ohio

[73] Assignee: Towmotor Corporation, Mentor, Ohio

[22] Filed: Apr. 30, 1975

[21] Appl. No.: 573,207

[52] U.S. Cl. .............................. 308/6 R; 187/9 E; 214/671; 308/219

[51] Int. Cl.² .................. F16C 17/00; B65G 47/00; B66B 9/20

[58] Field of Search ........... 308/219, 6 R, 3 R, 3 B, 308/62, 3.9, 31, 227; 214/671; 187/9

[56] References Cited

UNITED STATES PATENTS

| | | | |
|---|---|---|---|
| 3,467,450 | 9/1969 | Schmidt et al. | 308/62 |
| 3,768,595 | 10/1973 | Kelley, Jr. | 308/6 |

*Primary Examiner*—Joseph F. Peters, Jr.
*Assistant Examiner*—Richard A. Bertsch
*Attorney, Agent, or Firm*—Phillips, Moore, Weissenberger Lempio & Majestic

[57] ABSTRACT

A side thrust roller assembly particularly adapted for use in a lift truck mast unit to laterally position its carriage relative to an upright element while providing environmental protection for a thrust bearing within the assembly, the side thrust roller assembly including a roller engaging a lateral surface of the upright element, the roller and carriage having bores of different size, an adjusting spacer having an irregular bore being arranged between the roller and the carriage, a thrust bearing being disposed between the roller and adjusting spacer with a shaft having segments along its length for mating with the bores in the roller, adjusting spacer and carriage, the shaft segments for the roller bore and carriage bore being radially offset from each other to permit rotation of the shaft by the adjusting spacer for radially aligning the roller relative to the carriage, the adjusting spacer having a counterbore for receiving the thrust washer and a portion of the roller in order to prevent or minimize the entry of foreign material adjacent thrust surfaces of the bearing.

8 Claims, 3 Drawing Figures

U.S. Patent    April 26, 1977    4,019,786
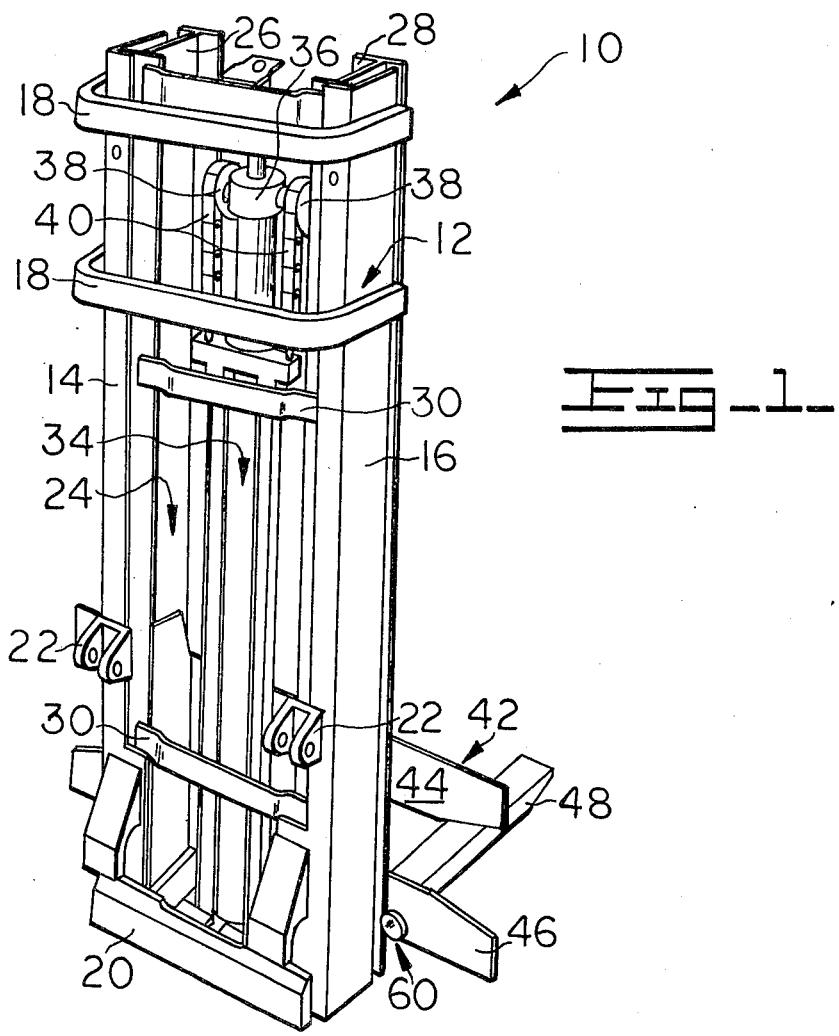
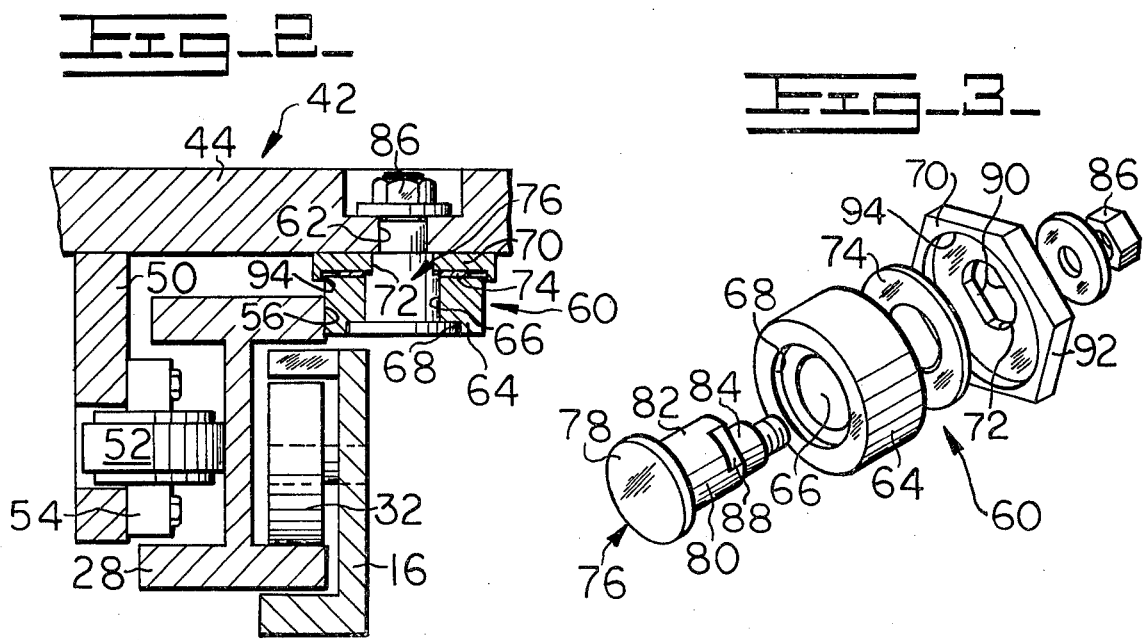

SHIELDED SIDE THRUST ROLLER ASSEMBLY FOR LIFT TRUCK MAST UNITS

BACKGROUND OF THE INVENTION

The present invention relates to a side thrust roller assembly and more particularly to such an assembly including means for preventing the entry of foreign material adjacent a thrust bearing within the assembly. The roller assembly is preferably employed within a lift truck mast unit for maintaining transverse alignment of its carriage with an upright element.

conventional mast units for lift trucks include one or more upright elements with a carriage assembly being arranged for longitudinal movement therealong. In one particular type of conventional mast unit, a movable upright structure including a pair of spaced-apart I-beams is vertically movable relative to a fixed upright structure. The carriage is also movable along the movable upright, thereby permitting the carriage to be raised from a position generally at ground level to the combined height of the fixed upright and movable upright.

During movement of the carriage relative to the movable upright, it is desirable to limit transverse of the carriage in order to prevent excessive wear and to facilitate operation of the mast unit. Side thrust roller assemblies are commonly employed for this purpose, the roller further tending to significantly minimize friction between the carriage and movable upright. The prior art has normally employed rollers arranged in a fixed relation upon the carriage for action against the movable upright. However, the variable dimensions found in most mast units require a custom fitting operation to insure that the rollers closely engage both sides of the movable upright.

Accordingly, it is an object of the present invention to provide a side thrust roller assembly for use of lift truck mast units wherein the position of the roller may be radially adjusted to insure its contact with a lateral bearing surface. The assembly also includes a thrust bearing nested together with a portion of the roller within a counterbore formed by an adjacent component of the assembly to prevent the entry of foreign material along the thrust surfaces of the bearing.

It is a further object of the invention to provide such a shielded side thrust roller assembly for use in conjunction with any relatively movable components wherein it is desirable to adjust the radial alignment of the roller and to minimize the entry of foreign material into the roller assembly.

Additional objects and advantages of the invention are made apparent in the following description having reference to the accompanying drawings.

BRIEF DESCRIPTION OF THE DRAWINGS

FIG. 1 is an isometric view taken generally from the rear of a lift truck mast unit to illustrate employment of the present shielded side thrust roller assembly thereon.

FIG. 2 is a fragmentary plan view taken in section through a portion of the lift truck mast unit as viewed in FIG. 1.

FIG. 3 is an exploded view of the shielded side thrust roller assembly.

DESCRIPTION OF THE PREFERRED EMBODIMENT

The present invention is directed toward a shielded side thrust roller assembly which is particularly contemplated for use upon a lift truck mast unit of the type generally indicated at 10 in FIG. 1. The roller assembly is adaptable to a wide variety of mast units and, in fact, is not even limited to such use. Rather, the roller assembly may be employed, for example, to provide a radially adjustable roller bearing between any two relatively movable elements where it is desirable to limit the entry of foreign material between bearing surfaces of the assembly.

Accordingly, the mast unit 10 is briefly described below only as a preferred environment for the present side thrust roller assembly.

The mast unit 10 includes a fixed upright section 12 comprised primarily of C-shaped channel members 14 and 16 which are spaced-apart and secured together by various components such as the brackets indicated at 18 and the lower spacer element 20. A pair of brackets or trunnion plates 22 are respectively secured to the channel members 14 and 16 for mounting the mast unit upon a suitable lift truck (not shown).

A movable upright unit 24 is arranged between the channel members 14 and 16, the movable upright including a pair of I-beams 26 and 28 which are secured to each other in fixed apart relation by additional brackets such as those indicated at 30. A number of rollers such as that indicated at 32 in FIG. 2 are arranged for bearing interaction between the resepctive channel members 14, 16 and the I-beams 26, 28 of the movable upright.

The movable upright unit 24 is raised relative to the fixed upright 12 by means of a conventional hydraulic jack generally indicated at 34. A cross-head 36 is carried above the jack unit 34 to support a pair of rotatable sheaves 38. A pair of chains 40 are trained respectively over the sheaves 38 and extend downwardly for connection with a carriage unit generally indicated at 42.

The carriage unit 42 is also of conventional configuration including cross-pieces 44 and 46 together with one or more forwardly extending forks such as that indicated at 48. Referring particularly to FIG. 2, the carriage unit 42 also includes a vertically arranged beam 50 arranged closely adjacent the movable upright beam 28. A similar vertical beam upon the carriage is also arranged adjacent the other movable upright beam 26 together with a similar roller unit of the type described immediately below.

As may also be seen particularly in FIG. 2, one or more rollers, such as that indicated at 52, may be secured to the beam 50 by means of brackets, such as that indicated at 54, for bearing engagement with the movable upright beam 28. The bearing rollers 52 tend to transversely position the carriage relative to the movable upright unit 24. However, additional thrust rollers are commonly provided upon the carriage unit to also engage outer lateral surfaces of the movable upright unit such as the surface indicated at 56 upon the movable upright beam 28.

As was also indicated above, it has been known in the prior art to employ rollers arranged in fixed relation upon the carriage for rotating engagement with lateral surfaces such as that indicated at 56. However, as was also indicated above, the present invention contemplates an adjustable side thrust roller assembly for use in this location to permit radial adjustment of the roller and thereby assure continued bearing engagement between the carriage unit and the outer lateral surfaces of the movable upright.

The side thrust roller assembly of the present invention is generally indicated at 60 in FIG. 1 but may be best seen by combined reference to FIGS. 2 and 3.

The roller assembly 60 is preferably mounted upon the carriage unit 42 by means of a bore 62 formed in the cross-piece 44, the bore 62 being illustrated as having a stepped configuration. A roller 64 is formed with a bore 66 of different size from the bore 62. Preferably, the roller bore 66 has a stepped portion 68 for a purpose described immediately below. The roller 64 is arranged generally adjacent the bore 62 with at least a portion of the roller periphery being in alignment with the lateral surface 66.

An adjusting spacer 70 having an irregular bore 72 is arranged between the roller 64 and the carriage unit together with a simple annular thrust bearing 74.

Referring particularly to FIG. 3, a shaft 76 is designed to pass through the bores formed in the roller 64, the bearing 74, the adjusting spacer 70 as well as the bore 62 formed in the carriage unit. The shaft 76 has a bearing flange 78 formed at one end to fit within the stepped bore 68 in the roller. The shaft also has segments 80, 82 and 84 formed along its length for respective mating engagement with the bores formed respectively in the roller 64, the adjusting spacer 70 and the carriage cross-piece 44.

The opposite end of the shaft which penetrates through the bore 62 is threaded for engagement by a nut indicated at 86 to secure the roller and adjusting washer in place upon the carriage unit.

The centrally arranged shaft segment 82 is preferably formed to have diametrically opposed flat, chordal surface segments such as that indicated at 88. Mating chordal surface segments 90 are also formed within the bore 72 for the adjusting spacer 70 so that the shaft is rotatable by the adjusting washer.

The outer periphery of the adjusting spacer 70 is preferably larger than the roller 64 while having a configuration as indicated at 92 in FIG. 3 to facilitate its engagement by means of a wrench (not shown), for example.

The shaft segment 84 mating with the carriage bore 62 is offset relative to the shaft segment 80 which mates with the roller bore 66. This provides an eccentric configuration so that rotation of the shaft 76 by the adjusting spacer 70 serves to radially position the roller 64. In this manner, the position of the roller 64 may be adjusted to assure its close engagement with the lateral surface 56 upon the movable upright beam 28.

In accordance with the present invention, the adjusting washer 70 is further formed with a relatively large counterbore arranged upon one side or end of the adjusting spacer facing the thrust bearing 74 and the roller 64. The depth of the counterbore 94 is selected to entirely overlap the thrust bearing 74 and to partially encompass the periphery of the roller 64.

The diameter of the counterbore 94 is selected to be only slightly larger than the outer diameter of the roller. This assures a lack of interference between these components of the roller assembly while also tending to substantially eliminate or minimize the entry of foreign material adjacent the thrust surfaces of the bearing 74.

In this manner, the roller assembly of the present invention may be expected to operate over an increased lifetime since minimum wear can be expected upon bearing surfaces within the assembly.

A similar lateral surface such as that indicated at 56 is also formed by the other I-beam 26 upon the opposite side of the movable upright unit. For antecedent purposes herein, cross-piece 44 may be considered a "first element" whereas each of the I-beams 26 and 28 may be considered to constitute a "second element" movable longitudinally relative to the "first element". A similar adjustable side thrust roller assembly may be mounted at the opposite end of the cross-piece 44, the two rollers thus being adjustable to assure their close engagement with opposite sides of the movable upright unit.

I claim:

1. In a lift truck mast unit including an upright element having a lateral surface, a carriage being arranged for longitudinal movement relative to the upright element and motor means for moving the carriage relative to the upright element, a shielded side thrust roller assembly, comprising a roller suitable for engagement along its periphery with the lateral surface of the upright element, the roller having a bore extending axially therethrough, the carriage forming a bore of different diameter than the bore in the roller and in axial alignment therewith, an adjusting spacer having an irregular bore, the adjusting spacer being arranged between the roller and the carriage, a thrust bearing arranged between the roller and adjusting spacer, the adjusting spacer being formed with a counterbore facing the roller, the counterbore having a diameter slightly larger than the roller and an axial depth sufficient to receive the thrust bearing and an axial portion of the roller, a shaft having segments formed to mate respectively with the bores in the roller, the adjusting spacer and the carriage, the shaft segments mating with the roller bore and carriage bore having their axes radially offset from each other in eccentric fashion, and means for retaining the shaft within the roller bore and carriage bore.

2. The shielded side thrust roller assembly of claim 1 wherein the outer periphery of the adjusting spacer is configured for engagement by a wrench means.

3. The shielded roller assembly of claim 1 wherein the roller has a stepped bore, the shaft having a bearing flange on one end to fit within the stepped bore, the other end of the shaft which penetrates through the carriage bore being threaded for engagement by a nut means.

4. The shielded roller assembly of claim 3 wherein the bore formed within the adjusting spacer is of approximately the same size as the bore in the roller while having a flat chordal surface section therein, the shaft segment arranged for mating engagement with the adjusting spacer being formed with a similar flat chrodal surface segment to permit rotation of the shaft by the adjusting spacer.

5. In the shielded side thrust roller assembly providing an adjustable bearing means between first and second longitudinally movable elements, the first element having a bore extending therethrough and the second element having a lateral surface arranged parallel to the axis of the bore through the first element, comprising
- a roller suitable for engagement along its periphery with the lateral surface of the second element, the roller having a bore extending axially therethrough, the first element bore being of different diameter than the bore in the roller and in axial alignment therewith,
- an adjusting spacer having an irregular bore, the adjusting spacer being arranged between the roller and the first element,
- a shaft having segments formed along its length to mate respectively with the bores in the roller, the adjusting spacer and the first element, the shaft segments mating with the roller bore and first element bore having their axes radially offset from each other in eccentric fashion, and
- means for retaining the shaft within the roller bore and carriage bore, the improvement comprising
- a separate and annular thrust bearing arranged between the roller and adjusting spacer and mounted on the same side of said first element therewith, the adjusting spacer being formed with a counterbore facing the roller, the counterbore having a diameter slightly larger than the roller and an axial depth sufficient to receive the thrust bearing and an axial portion of the roller.

6. The shielded roller assembly of claim 5 wherein the roller has a stepped bore, the shaft having a bearing flange on one end to fit within the stepped bore in order to minimize the entry of foreign material between the roller and the shaft, the other end of the shaft which penetrates through the carriage bore being threaded for engagement by a nut means.

7. The shielded roller assembly of claim 6 wherein the bore formed within the adjusting spacer is of approximately the same size as the bore in the roller while having a flat chordal surface section therein, the shaft segment arranged for mating engagement with the adjusting spacer being formed with a similar flat chrodal surface segment to permit rotation of the shaft by the adjusting spacer.

8. The shielded roller assembly of claim 7 wherein the outer periphery of the adjusting spacer has wrench engaging means formed thereon.

* * * * *